UNITED STATES PATENT OFFICE.

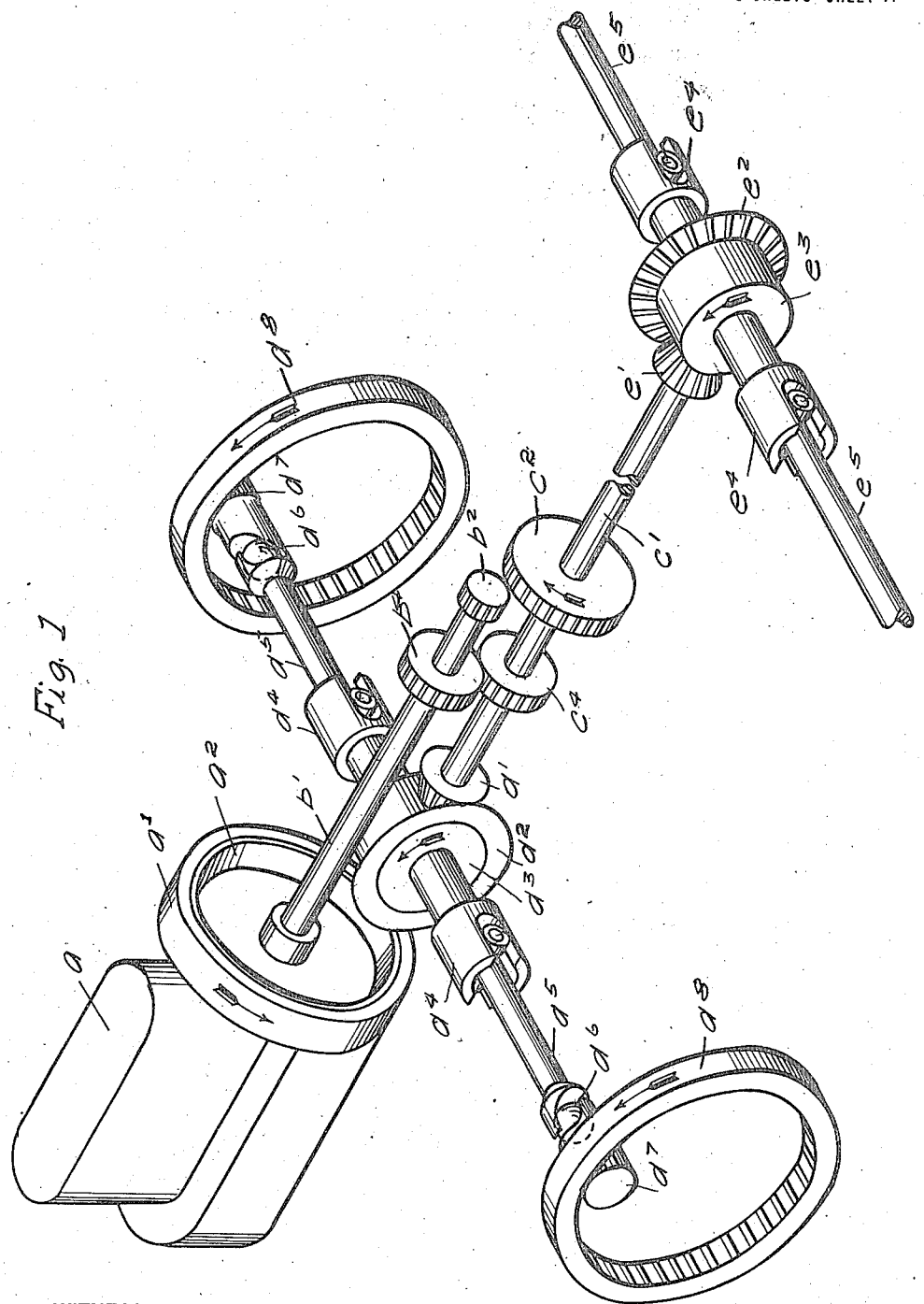

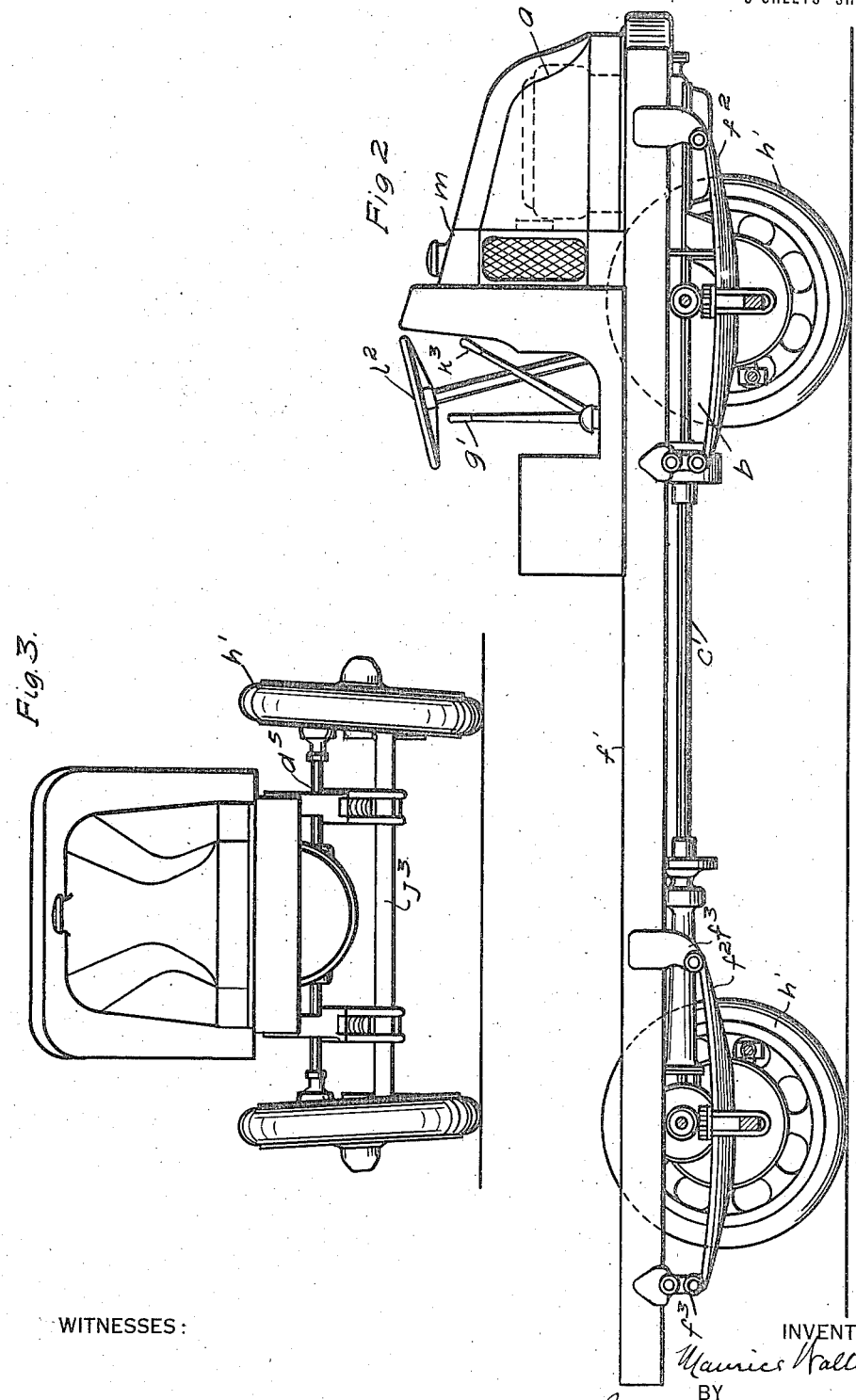

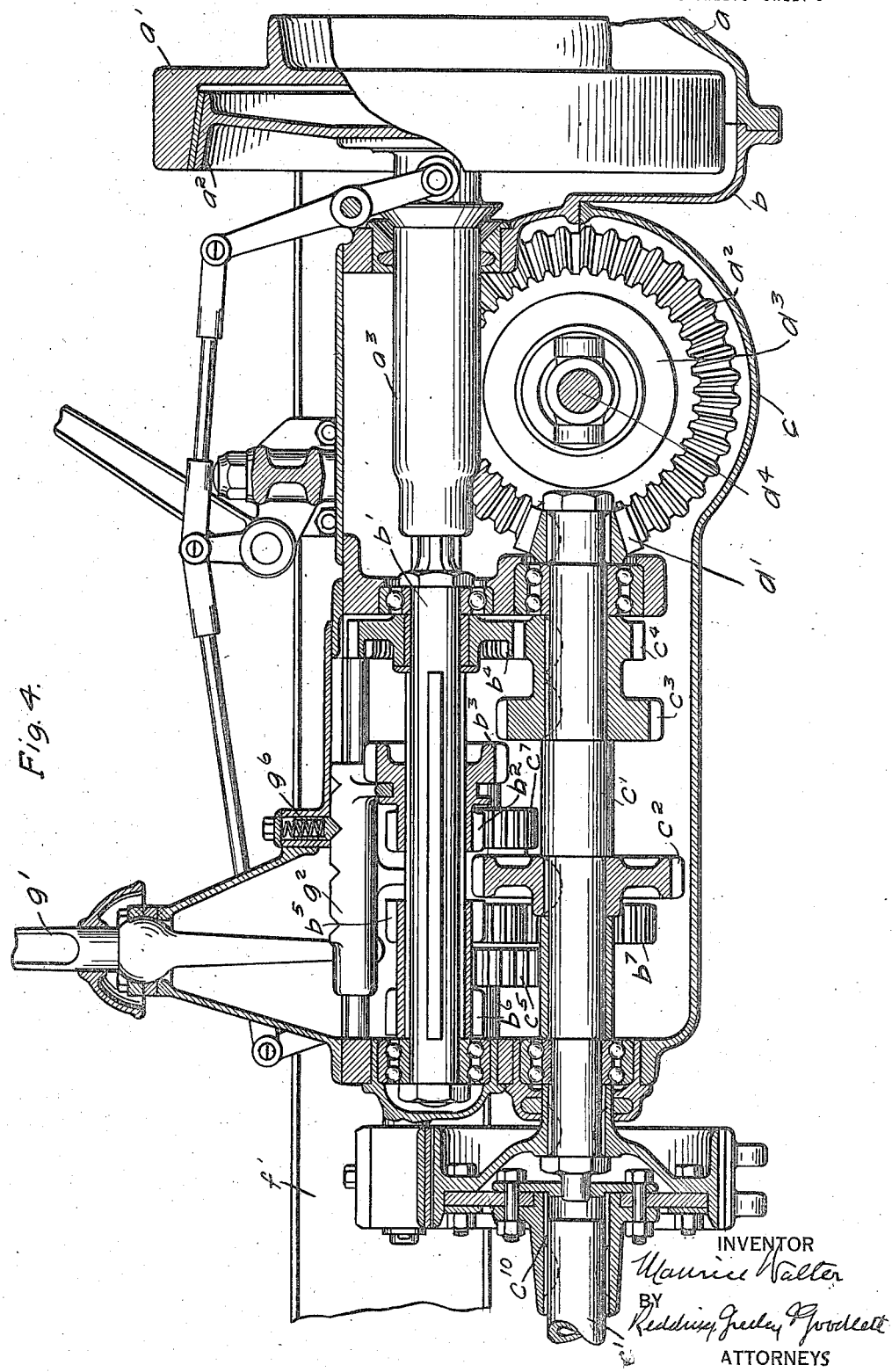

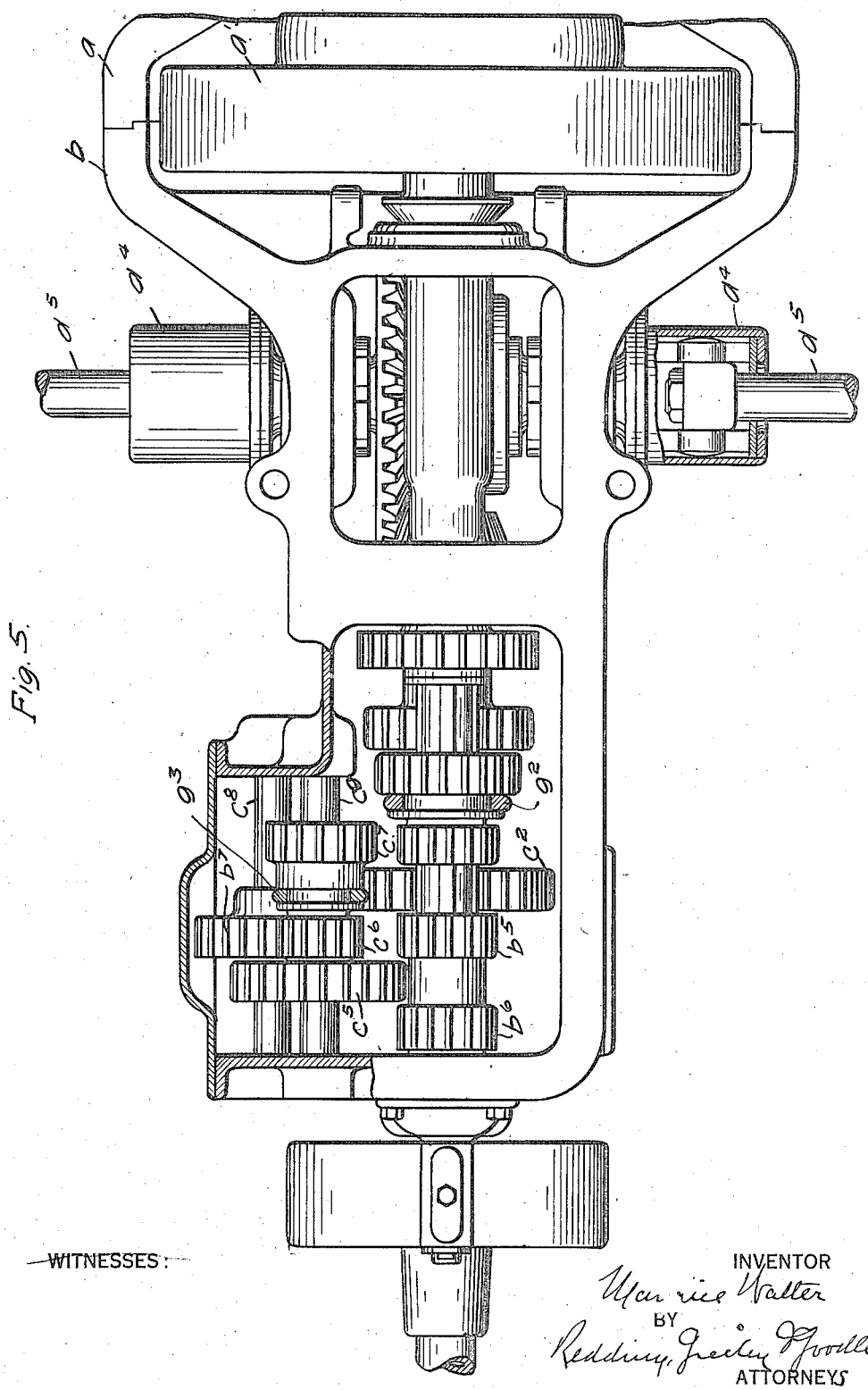

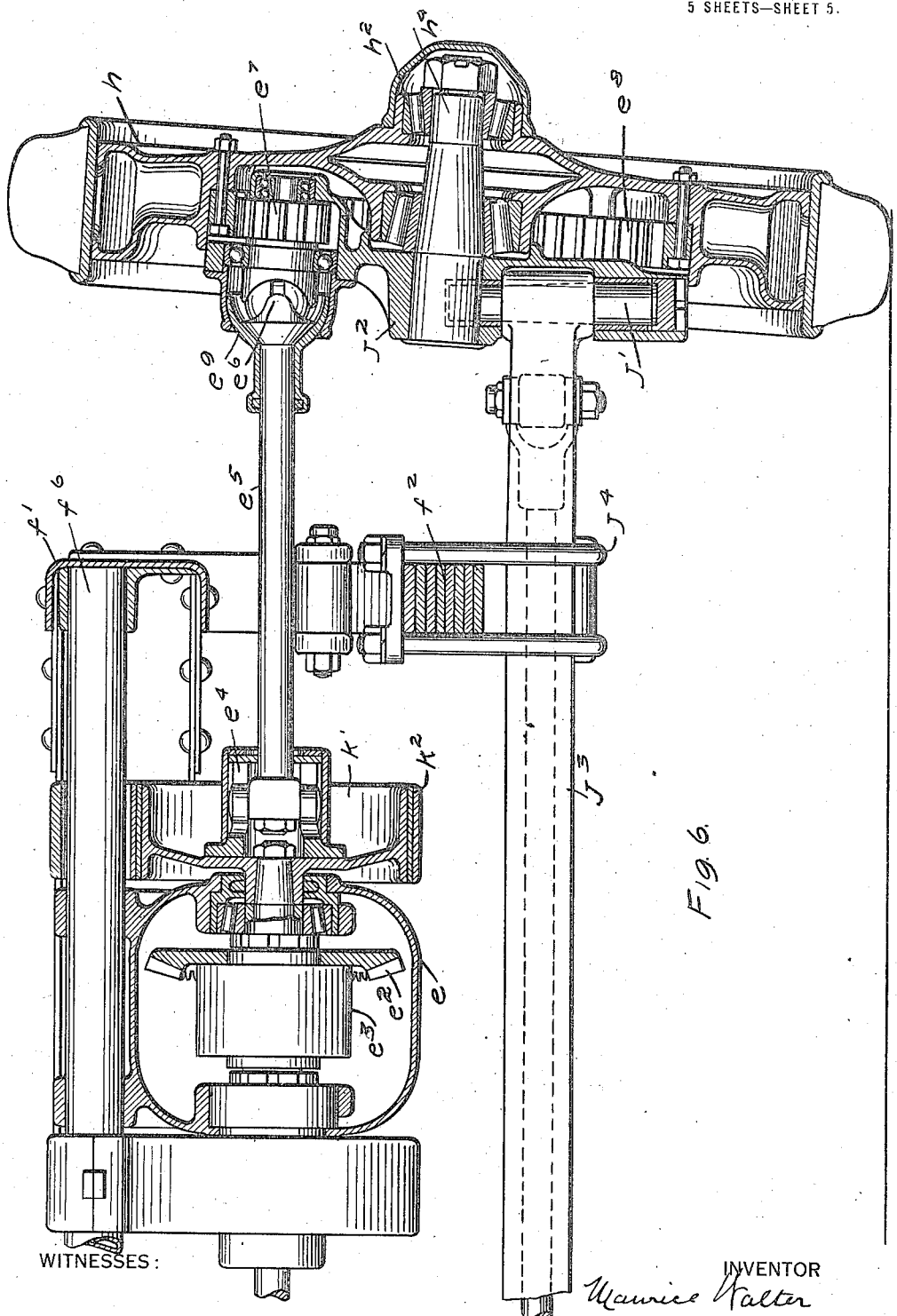

MAURICE WALTER, OF NEW YORK, N. Y.

MOTOR-VEHICLE.

1,301,342.　　　Specification of Letters Patent.　　Patented Apr. 22, 1919.

Application filed September 13, 1916. Serial No. 119,842.

*To all whom it may concern:*

Be it known that I, MAURICE WALTER, a citizen of the United States, residing in the borough of Manhattan of the city of New York, in the State of New York, have invented certain new and useful Improvements in Motor-Vehicles, of which the following is a specification, reference being had to the accompanying drawings, forming a part hereof.

This invention relates generally to motor vehicles and is concerned particularly with commercial vehicles of the type in which both the driving and the steering efforts are applied to each one of the four wheels. The main object of the invention, broadly, is to improve the construction of vehicles of this type in such respects as to render them more efficient and reliable in operation, more adaptable for heavy service under unfavorable road conditions, easy of control both as regards the transmission and steering devices, and readily accessible in all of its units for purposes of inspection or repair, and to give them greater range in speed control and tractive effort. More particularly the objects of the invention may be divided into four main divisions, each one of which, while admitting of separate discussion, bears a definite relation to each of the other objects in so far as concerns the broad advantages to be derived from the improved truck considered as a whole. The first of these objects is to improve the driving mechanism for four-wheel vehicles in such manner that the power from the motor is transmitted directly and with minimum frictional losses to the driving gears for the front and rear wheels, respectively. Incidental to the carrying out of this object, the said driving elements are so constructed and arranged with relation to one another that space is economized, accessibility is realized, and a desirable disposition of the Cardan shafts, vehicle axles and motor is effected, particularly at the front of the vehicle where the motor is positioned.

The second main object of the invention, which is closely related to the first object, has to do with the transmission. In the improved transmission, power from the motor shaft is communicated directly to a counter shaft from which power is distributed directly to the Cardan shafts or driving differentials therefor. This improved transmission, in addition, includes devices whereby the operator may secure selectively three speeds forward and may, in addition, by proper control, secure a fourth speed and a reverse through suitable compounding gears slidably supported on auxiliary counter shafts carried in the gear case. The three speeds resulting from selective control in the usual manner give the improved truck a range of speed of at least the ordinary extent, while the low speed secured by the additional compounding gears permits the truck to be operated, under extraordinary conditions, at a speed in which the power ratio is increased some hundred per cent. over that usually available while the speed range itself is correspondingly increased appreciably.

In these drawings—

Figure 1 is a schematic view showing so much of the driving mechanism of the improved truck as is necessary for an understanding of the improvements of its driving mechanism.

Fig. 2 is a view in side elevation showing the application of the improvements to the chassis of a truck.

Fig. 3 is a view in front elevation of the truck shown in Fig. 2 and bringing out particularly the disposition of the Cardan shafts.

Fig. 4 is a view in vertical section taken through the gear box in which are inclosed the improved transmission devices.

Fig. 5 is a view in plan showing the transmission elements of Fig. 4 and illustrating particularly the relative disposition of the compounding gears.

Fig. 6 is a view in central section through one of the wheels of the improved truck and showing so much of the truck frame and the driving elements for the wheel as is necessary for an understanding of this feature of the invention.

The improved truck has each one of its four wheels operatively geared with a motor $a$ of any suitable form, mounted, as usual, at the front end of the chassis. Immediately to the rear of the motor $a$ is mounted a suitable clutch, illustrated herein as comprising two coöperating friction members $a'$, $a^2$, and from this clutch motive power is communicated to the motor shaft $b'$. This shaft, as will be evident from Fig. 1, is alined with the shaft of the motor and extends rearwardly in parallelism with the longitudinal axis of the vehicle chassis. In describing the improved driving mechanism for the truck it will be sufficient to refer to the conventional illustration of the parts as laid out in Fig. 1, although as this description proceeds and the improved transmission is taken up for consideration, the details of the selective gearing will be described at length. In Fig. 1, it appears that there is provided only a single counter shaft $c'$ from which the power derived from the motor shaft $b'$ is delivered direct to the actuating differentials $d^3$, $e^3$, for the Cardan shafts $d^5$, $e^5$, respectively, of the front and rear wheels. This counter shaft $c'$ extends longitudinally of the vehicle chassis and is preferably disposed directly beneath the motor shaft $b'$ so as to permit the gears $b^2$, $b^4$, etc., on the motor shaft $b'$ and the coöperating gears $c^2$, $c^4$, on the counter shaft to be manipulated readily for changing speeds in a manner now well known. The distinctive point in the driving shafts and gearing illustrated in Fig. 1 resides in the fact that the power taken from the motor shaft $b'$ is delivered directly to a main drive shaft $c'$ instead of being transmitted, in the usual manner, through one or more independent lay shafts and the attendant gearing. The main driving shaft $c'$ carries at each end suitable driving gears illustrated as bevel pinions $d'$, $e'$, arranged to mesh, respectively, with the master gears $d^2$, $e^2$ on the differentials $d^3$, $e^3$, respectively. By reason of the employment of the motor shaft $b'$ and the driving shaft $c'$ and their peculiar disposition with relation to one another, it becomes possible, in the improved truck, to mount the front differential $d^3$ in the most advantageous relationship to the driving mechanism, the motor and the supporting axles $j^8$. As shown in Fig. 1, the differential $d^3$ is supported just behind the motor clutch and below the motor shaft $b'$, so that space is economized and the overhang of the motor is minimized. Further, in this construction, it is proposed to support the differential casings directly on the vehicle frame rather than on the axles, so that these casings partake of the movements of the frame and have no relative movement with relation thereto. With this condition it becomes possible to interpose suitable couplings, illustrated generally at $d^4$, $e^4$, $d^6$, $e^6$, between the said differentials and the driving pinions $d^7$, $e^7$, and thereby afford that degree of flexibility to both the wheels and axles which is most necessary for the absorption of all strains. This flexibility as between the front and rear units is in nowise impaired by the interposition of the driving shaft $c'$ since this shaft itself includes flexible couplings, indicated generally at $c^{10}$, which are adapted to allow for frame distortion.

The driving mechanism described differs largely from those heretofore known in the elimination of one differential gear, that between the front and rear axles, and in the omission of the usual independent counter shaft or counter shafts between the motor shaft $b'$ and the driving shaft $c'$. In the improved construction the counter shaft serves directly as the power distributing shaft between the front and rear differentials and so the efficiency of the transmission is greatly increased and the frictional losses correspondingly decreased. This peculiar construction is also specially adapted to the inclusion of universal joints without loss of power and resulting flexibility in the entire chassis and associated gearing. Again, the peculiar relation between the motor shaft $b'$ and the counter shaft $c'$ permits these shafts to be extended directly into the gear box and facilitate the association of this gear box with the motor and the front differential $d^3$ in such manner as to create at this portion of this truck a single unit power plant. The relation of the differential to these essential elements in the unit power plant will appear at greater length hereinafter in connection with the improved transmission. It is to be noted, however, that one of the important results secured by reason of the space afforded for the mounting of the Cardan shafts $d^5$ directly below the motor shaft $b'$ and just behind the motor $a$ is the lowering of the motor on its frame and an increase in its accessibility, sightliness and effectiveness for transmission of its power along a straight line for the wheel drive shafts. Heretofore, motors of this character have been mounted well above the differential housing on the axle and the drive shafts from the transmission to the differential were suitably inclined.

Reference is now to be had particularly to Figs. 4 and 5 for a detailed description of the improved transmission which, as explained hereinbefore, is peculiarly adapted for commercial vehicles of the type with which this invention is concerned. As shown in Fig. 4, the motor shaft $b'$ in the gear casing C has splined thereon a series of gears $b^3$, $b^4$, etc., of the usual type and these gears are arranged to be brought into operative engagement with corresponding gears $c^2$, $c^3$, $c^4$, etc., carried by the counter shaft $c'$. This counter shaft, as before stated, is preferably journaled directly below the motor shaft $b'$ and receives its power directly therefrom through the gears just named. At the front end of the counter shaft $c'$ is carried a bevel pinion $d'$ for engagement with the master bevel gear $d^2$ on the differential housing $d^3$ into which extend the driven shaft sections $d^4$. From the gear casing C the shaft $c'$ is extended rearwardly for direct engagement with the differential $e^3$ for the wheels. Selective forward speeds of the truck are provided for through the usual fork $g^2$ and gear lever $g'$ whereby any one of the several gear combinations may be secured by the operator. A feature of improvement, however, peculiar to the present invention, resides in the provision of the straight fork $g^2$ which by successive longitudinal movements in the same direction will serve to bring about the three usual forward speeds. In this way, the gear lever $g'$ may be readily manipulated while the H-gate or equivalent devices are eliminated. The fork $g^2$ is held releasably in its several positions by a spring-pressed detent $g^6$ in a manner which will be understood. In addition to the three forward speeds provided for by the direct engagement of gears on the motor shaft $b'$ and the driven counter shaft $c'$, provision is made in the new transmission for a fourth low-speed of the car and also for the reversal thereof. Such provision is found in suitable compounding gears $c^5$, $c^6$, $c^7$, $b^7$, carried on one or the other of two counter shafts $c^8$, $c^9$, fixed in the gear casing C. These last named gears are manipulated by means of an independent yoke $g^3$ in a manner which is now generally familiar. By suitably disposing the gears on the compounding shafts $c^8$ or $c^9$ or both with relation to the gears on the motor shaft $b'$ or the gears on the counter shaft $c'$ or both, the car may be caused to travel at a very low speed, say at a ratio of 8 to 1, and a marked increase in tractive effort, amounting to perhaps 100%, may be secured. Ordinarily, of course, it may be sufficient to use the three selective forward speeds, but where the truck is started with a heavy load and where road conditions are unfavorable, this additional power may be brought into play at once by proper manipulation of the compounding gears. By other manipulations, the direction of travel of the car may be reversed.

The description of the improved transmission serves to emphasize the many advantages derived therefrom. The provision of a unit power plant in which the differential is incorporated in the transmission casing and is disposed forwardly of the change speed gears, is new in trucks of this character, as is the mounting of the driven shafts of the differential directly below the motor shaft and between the transmission gears and the motor. The ease of control secured by providing three selective speeds forward by a unidirectional movement of the gear lever $g'$ is of great advantage, while the provision of an independent gear shift for the reserve low-speed and the reverse serves to require special manipulation by the driver in a manner which is desirable and guards against careless shifting. The additional speed and power range secured by the provision of the low-speed compounding gears is achieved without any of the disadvantages usually following efforts to increase this range, since these compounding gears are in fact idle during normal operation of the improved truck and are not in mesh with any of the gears of the motor shaft $b'$ or the counter shaft $c'$.

The improved steering devices with a detailed illustration of the means by which great flexibility of the frame is secured are to be found in Fig. 6. From this figure it appears that the wheel $h'$ is carried on a spindle $h^4$ by suitable anti-friction rollers $h^2$ and that the steering pivot $j'$ in the end of the axle $j^3$ is fixed with an axis which falls at about the inner edge of the tire of the wheel. This pivot $j'$ is also disposed somewhat below the spindle $h^4$. The object of this construction is to impart to the wheel in its turning movements a rolling action as distinguished from a twisting one and the result sought can only be secured by alining the axis of the pivot $j'$ at about the inner edge of the tire. The same result has been sought heretofore by various means and it has formerly been proposed to place the steering pivot $j'$ in the plane of the tread of the tire and also well outside of the plane of the wheel, but both of these constructions have been faulty in either permitting a twisting action on the tread of the tire or in producing an exaggerated rolling action which made it difficult to control the direction. In the improved construction there has been shown a convenient way of forming the steering pivot $j'$ and mounting it in the wheel at the desired point. This construction consists in making the steering knuckle $j^2$ of such form as to carry the pivot $j'$ and also to support the free end of the Cardan shaft $e^5$. The drive herein contemplated is one with an internal gear $e^8$ with which the pinion $e^7$ on the end of the Cardan shaft $e^5$ meshes. Related to the improved steering devices are the means for permitting free movement of the wheel and axle without interfering with the transmission of the driving effort to the wheel either during straight movement of the vehicle or when the steering-devices are being operated. The details of the Cardan shafts $e^5$ and the associated elements are brought out in Fig. 6. In this figure it appears that each Cardan shaft $e^5$ is driven from its differential gear $e^3$ through a sliding universal joint $e^4$ and has its outer end connected with the driving pinion $e^7$ through a ball universal joint $e^6$, one member of which carries a spherical casing $e^9$ disposed within a corresponding spherical section on the steering knuckle $j^2$. The casing $e^9$ serves to hold the members of the universal coupling $e^6$ in proper engagement and also to exclude dirt and dust therefrom. In the construction just described it is evident that the casing $e^3$ of the differential being supported from the housing $e$ on the chassis $f'$ of the vehicle, partakes of the movements of the vehicle and so has relative movement constantly with relation to the wheels and axles. Such movement has no influence on the transmission of the driving effort, however, by reason of the inclusion of the universal joints $e^4$ and $e^6$ between the differential and the driving pinion $e^7$ and the wheel. Movements of the wheel in any plane or distortion of the frame $f'$ and the axles $j^3$ can have no adverse influence on the driving mechanism or even impair its efficiency, since the described flexibility is always present for the absorption of injurious strains and stresses.

A further feature of the improved steering construction and flexible driving mechanism has to do with the relative disposition of the spring $f^2$ and the axle $j^3$. By disposing the pivot $j'$ of the steering knuckle off center with relation to the spindle $h^4$, that is, well below it, and extending the Cardan shaft $e^5$ to the wheel along a line near its periphery, the axle $j^3$ is permitted to be dropped well below the side frame members of the chassis $f'$ and the spring $f^2$ and the axle $j^3$ has its resiliency and effectiveness correspondingly increased while affording ready accessibility to all of the parts under the chassis. Furthermore the placing of the axle below the wheel-spindle, so that the point of application of the spring to the axle shall be below the axis of the spindle, makes it possible to utilize the driving reaction to neutralize in part the torque reaction. This arrangement also has a constructional advantage in that it permits the member which carries the steering knuckle, the wheel spindle and the driving pinion to be a single casting, while the spindle itself may be a separate forging fixed therein.

I claim as my invention:

1. In a motor vehicle, in combination with the axles, the vehicle frame spring supported thereon, the four wheels and the motor shaft, driving shafts for the pairs of wheels, a differential gear for each pair of driving shafts, the front differential gear being mounted directly behind the motor, a power distributing shaft having pinions on its ends engaged operatively with said differential gears, a transmission casing in which the front differential is disposed and a housing for the rear differential mounted on the vehicle frame.

2. In a motor vehicle, in combination with the axles, the vehicle frame spring supported thereon, the four wheels and the motor shaft, driving shafts for the pairs of wheels, a differential gear for each pair of driving shafts, the front differential gear being mounted directly behind the motor, a power distributing shaft having pinions on its ends engaged operatively with said differential gears, a transmission having three speeds with a single reduction between the motor shaft and the power distributing shaft, a transmission casing in which the transmission and the front differential is disposed and a housing for the rear differential mounted on the vehicle frame.

3. In a motor vehicle, in combination with the axles, the vehicle frame spring supported thereon, the four wheels and the motor shaft, driving shafts for the pairs of wheels, a differential gear for each pair of driving shafts, the front differential gear being mounted directly behind the motor, a power distributing shaft having pinions on its ends engaged operatively with said differential gears, a transmission having three speeds with a single reduction between the motor shaft and the power distributing shaft, and a low and a reverse speed with a double reduction between the motor and the power distributing shaft, a transmission casing in which the transmission and the differential is disposed and a housing for the rear differential mounted on the vehicle frame.

4. In a motor vehicle, in combination with the four wheels thereof and the motor shaft, driving shafts for the pairs of wheels, a front differential gear for the front driving shafts disposed directly behind the motor and below the motor shaft, a power distributing shaft mounted below the motor shaft and engaged operatively with the said differential gears, and change speed gearing by which the power of the motor shaft is transmitted directly and by a single reduction to the said distributing shaft.

5. In a motor vehicle in combination with the four wheels thereof and the motor shaft, driving shafts for the pairs of wheels, a front differential gear for the front driving shaft disposed directly behind the motor and below the motor shaft, a power distributing shaft mounted below the motor shaft and engaged operatively with the said differential gears, and change speed gearing by which the power of the motor shaft is transmitted directly and by a single reduction to the said distributing shaft for forward drive, and a reverse and low speed having compounding gears to effect a double reduction between the motor shaft and the driving shaft.

6. In a motor vehicle, in combination with the four wheels thereof and the motor shaft, driving shafts for the pairs of wheels, a front differential gear for the front driving shaft disposed directly behind the motor and below the motor shaft, a power distributing shaft mounted below the motor shaft and engaged operatively with the said differential gears, and change speed gearing by which the power of the motor shaft is transmitted directly and by a single reduction to the said distributing shaft, for forward drive, and a reverse and a low speed having compounding gears to effect a double reduction between the motor shaft and the driving shaft and independent means for shifting the speed pinions of the single reduction speed gearing and for shifting the compounding gearing.

This specification signed this 8th day of September A. D. 1916.

MAURICE WALTER.